United States Patent
Oliver

[15] 3,676,818
[45] July 11, 1972

[54] CONTROL STICK TRANSDUCER

[72] Inventor: Kenneth L. Oliver, Phoenix, Ariz.
[73] Assignee: Sperry Rand Corporation
[22] Filed: May 10, 1971
[21] Appl. No.: 141,898

[52] U.S. Cl. .................................338/2, 244/83 E, 244/83 R
[51] Int. Cl. ............................................................G01l 1/22
[58] Field of Search....................338/2, 3, 5; 244/83 E, 83 R; 73/133, 141 A

[56] References Cited

UNITED STATES PATENTS

| | | | |
|---|---|---|---|
| 3,434,342 | 3/1969 | Kazmarek | 73/133 |
| 3,447,766 | 6/1969 | Palfreyman | 338/5 X |

Primary Examiner—C. L. Albritton
Attorney—S. C. Yeaton

[57] ABSTRACT

A transducer for monitoring forces applied to an aircraft control stick includes a spring flexure which acts as a primary restraint to loads applied to the control stick.

The spring flexure is secured to the transducer housing and disposed in a horizontal plane. The control stick handgrip is supported above the spring flexure by means of a vertical member passing through a central hub of the spring flexure so that the flexure provides a resilient mounting responsive to forces applied to the handgrip in any horizontal direction. A counterbalance suspended from the same hub of the flexure cancels the effect of any acceleration forces parallel to the spring flexure that may be induced in the mass of the handgrip and its mounting.

Cantilevered load beams are arranged to deflect in response to loads applied to the handgrip in excess of an adjustable threshold value. Strain gauges are used to measure the deflection of the load beams and thus provide electrical output signals indicative of the amount of command force applied to the handgrip. Stop members limit the deflection of the spring flexure to values suitable for use with the strain gauges.

8 Claims, 3 Drawing Figures

Patented July 11, 1972

INVENTOR
KENNETH L. OLIVER
BY Joseph M. Roehl
ATTORNEY

INVENTOR
KENNETH L. OLIVER
BY
Joseph M. Roehl
ATTORNEY

CONTROL STICK TRANSDUCER

BACKGROUND OF THE INVENTION

1. Field of the Invention

The invention relates to aircraft control devices and more particularly to aircraft control sticks providing an electrical output signal.

2. Description of the Prior Art

Aircraft control sticks ordinarily actuate the appropriate aircraft control surfaces through mechanical linkages.

Patent Application Ser. No. 116,334 entitled "Control Wheel Force Sensors", filed in my name and assigned to the present assignee concerns an aircraft control device which functions in cooperation with an aircraft control wheel to translate pilot-applied pitch and roll commands into appropriate electrical output signals to control the aircraft attitude. Individual flexure springs deflect in response to pitch and roll commands. The deflection of the flexures is detected and measured by a plurality of cantilevered load beams that actuate electrical strain gauges. The cantilevered beams are firmly affixed to the control column. The free ends of the cantilevered beams are actuated by yoke members which move in response to deflection of the flexures. Each yoke member is adjusted to permit an initial movement before contacting the free end of the respective cantilevered beams, thus effectively providing a predetermined dead zone. Adjustable stops limit the maximum deflection of the flexures. The dead zone prevents initial displacements of the control wheel, such as those caused by the weight of the pilot's hands, from affecting the strain gauges. The stops prevent the strain gauges from being subjected to excessive loads.

Although the invention of Ser. No. 116,334 provides a significant advance over the prior art, the method of mounting permits extraneous forces such as those induced by acceleration of the aircraft to affect the output signal. This effect is particularly noticeable in relatively small, highly maneuverable aircraft. The present invention utilizes the deflection sensing means of Ser. No. 116,334 but provides a mounting means that overcomes the effect of acceleration-induced forces.

SUMMARY OF THE INVENTION

The present invention concerns an aircraft control stick transducer which includes a primary spring flexure arranged to provide a virtual pivot point common to deflections in both the longitudinal and lateral axes. The pivot point not only allows the hub of the flexure to move spherically and without friction in response to any combination of pitch and roll commands, but also permits the mechanism to be mass-balanced so as to overcome extraneous acceleration-induced forces.

DESCRIPTION OF THE PREFERRED EMBODIMENT

Figure 1:
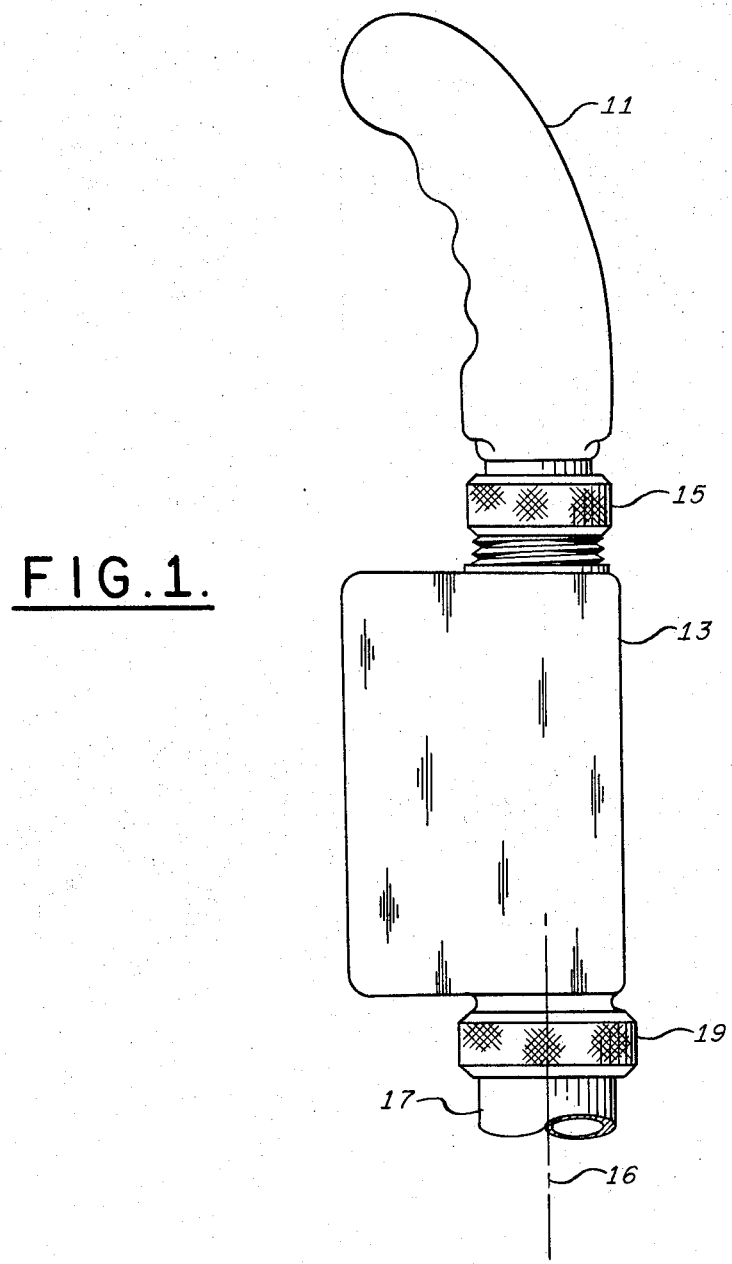
FIG. 1 is an outline drawing of a typical control stick transducer of the type employing the principles of the invention.

FIG. 1 illustrates a control stick transducer of the type in which the present invention may be used. A control grip 11 is mounted to the transducer housing 13 by means of a coupling ring 15. The transducer housing, in turn, is mounted along the axis 16 of the aircraft control column 17 by means of a coupling ring 19. Pitch command signals are applied to the handgrip 11 by moving the grip to the left or right to cause the craft to descend or ascend, respectively. Roll forces are applied in a direction normal to the plane of the paper in order to cause the craft to execute an appropriate roll maneuver.

Figure 2:
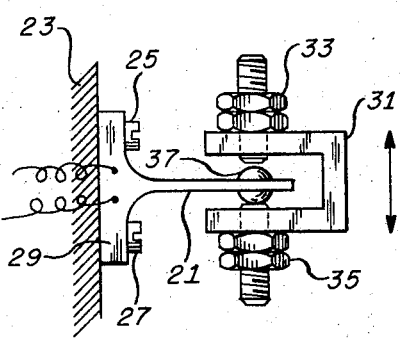
FIG. 2 is a schematic drawing illustrating a sensor mechanism useful in practicing the invention.

FIG. 2 illustrates a cantilevered beam sensing mechanism presently preferred for use with the invention. The sensing mechanism of FIG. 1 is essentially the same as that described in the aforementioned patent application.

In brief, this sensing mechanism includes a cantilevered load beam 21 secured to a member 23 by means of mounting screws 25 and 27. An electrical strain gauge is mounted in the base 29 of the cantilevered load beam. A slotted yoke 31 is movable with respect to the member 23 in response to forces applied to the handgrip along an axis indicated by the arrow. Adjustable screw arrangements 33 and 35 permit a predetermined amount of clearance to exist between the yoke 31 and a contacting ball 37 inserted in the cantilevered beam. As explained in the aforementioned patent application, the clearance provided by the yoke and the cantilevered beam permits a small amount of motion to occur before the strain gauge indicates an applied force. This threshold acts as a dead zone which permits the strain gauge to operate in its optimum region.

Figure 3:
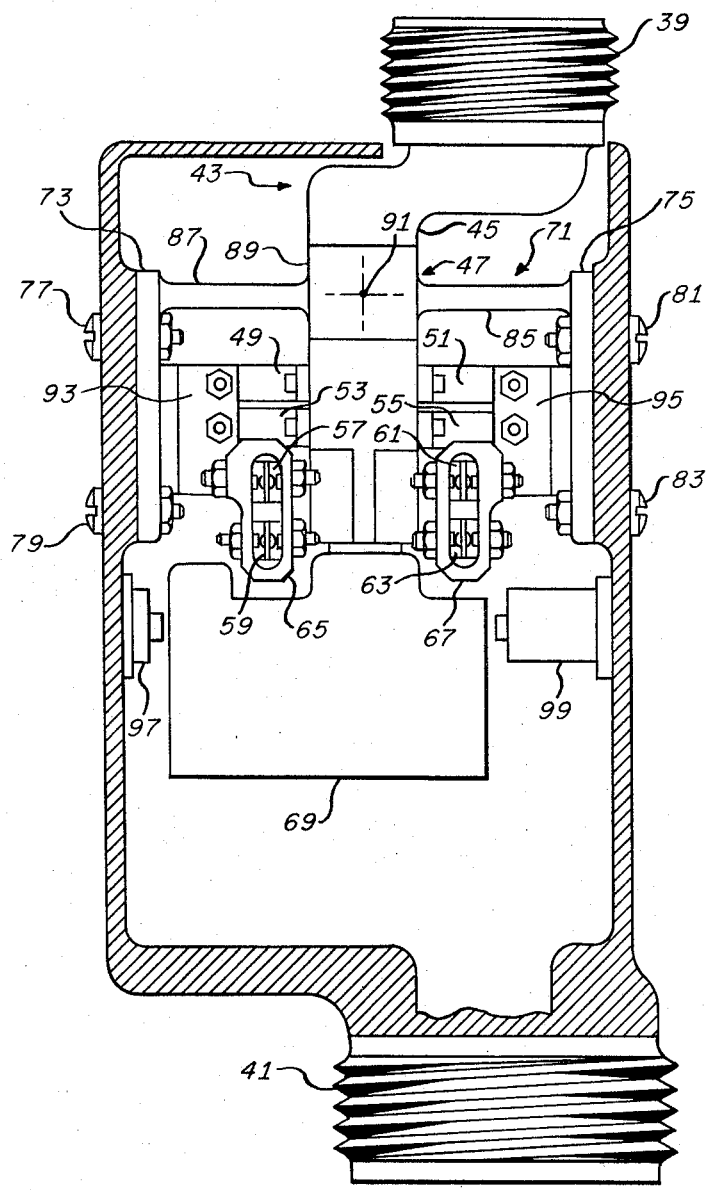
FIG. 3 is a drawing illustrating a typical arrangement of components used in practicing the invention.

FIG. 3 illustrates the arrangement of the components in a typical transducer and depicts the transducer 13 of FIG. 1 with the front plate removed to show the relationship of the various components within the transducer housing.

The threaded coupling 39 mates with the coupling ring 15 of FIG. 1 in order to attach the handgrip to the transducer housing. Similarly, a threaded coupling 41 permits the transducer housing to be secured to the aircraft control column.

The threaded couplings 39 and 41 may also support electrical connectors for coupling signals from the handgrip to the transducer or from the transducer to external electrical apparatus.

The threaded coupling 39 is part of a grip mount 43 which includes a mechanical coupling section 45 attached integrally to a shaft 47. The shaft 47 provides means for mounting cantilevered roll load beams 49, 51, 53 and 55 as well as cantilevered pitch load beams 57, 59, 61 and 63. The bases of the pitch load beams are located behind the pitch yoke members 65 and 67 and the free ends of the beams extend into the yoke members as depicted in FIG. 3. The base elements of the pitch load beams are secured to the shaft member 47. The shaft member 47 also supports a counterbalance 69.

The entire movable assembly is supported by means of a spring flexure 71 which is terminated in flange members 73 and 75 which are, in turn, secured to the housing by any suitable means such as bolt members 77, 79, 81 and 83.

The spring flexure consists of compliant arms 85 and 87. The compliant arms preferably have a rectangular cross-section in which the width is several times the thickness of the arm. The arms may be formed from a hardened steel so as to be only slightly compliant in response to expected command forces. The flexure member is disposed in a horizontal plane normal to the axis 16 of the control stick. With no command forces applied to the handgrip, the flexure remains in its quiescent condition and the arms 85 and 87 remain flat. A mounting hub 89 is formed integrally with the compliant arms and supports the shaft 47 in a rigid relationship with respect to the hub.

A pitch or roll command force applied to the handgrip causes the compliant arms 85 and 87 to deflect so that the mounting hub 89 effectively moves in a nutational fashion about a virtual pivot point 91. Effectively, the mounting hub may move in a spherical manner without friction since the only motion permissible is the motion provided by the deflection of the compliant arms 85 and 87.

Slotted yokes 93 and 95 straddle the free ends of the cantilevered roll load beams and support adjusting screws for setting the dead band for these load beams. The slotted yokes 93 and 95 are supported on the flanges 73 and 75, respectively. The yoke members 93 and 95 further support the pitch yoke members 65 and 67, respectively.

Thus all yoke members, as well as the spring flexure itself, are supported on the flange members 73 and 75. This arrangement is preferred in that it facilitates assembly and repair and also in that it isolates these critical elements from any flexure of the housing wall that might occur.

That various strain gauges mounted on the bases of the associated cantilevered beams respond to deflection of the beams whenever the motion of the shaft 47 is sufficient to cause a beam to contact the associated yoke member.

In accordance with the teachings of the aforementioned patent application, the dead zone provided by the slotted yokes permits the strain gauges to be operated in their most favorable regions.

Stop members 97 and 99 limit the motion of the movable portions of the transducer by limiting the arcuate motion of the counterbalance 69 in response to pitch commands. Similarly, stop members are provided on the back plate and the front plate of the transducer housing (not shown) so as to contact either the mechanical coupling section 45 or the counterbalance 69 when a predetermined maximum roll motion of the handgrip 11 occurs.

Various elements in the transducer may be readily replaced if necessary by virtue of the relatively simple arrangement of components.

The counterbalance 69 is selected and positioned on the shaft 47 to provide a moment of inertia about the virtual pivot point 91 which is equal to the moment of inertia of the handgrip 11 and its mounting elements about the same pivot point. Thus acceleration forces induced in the handgrip 11 because of aircraft maneuvering are balanced by the acceleration forces induced in the counterbalance 69 and its mounting system.

The electrical leads from the various strain gauges may be brought out through the lower threaded coupling 41 to exterior utilization apparatus.

The transducer illustrated in FIG. 3 provides quadruple redundancy in both the pitch and roll planes. It will be understood, however, that any suitable degree of redundancy may be provided as described.

While the invention has been described in its preferred embodiment, it is to be understood that the words which have been used are words of description rather than limitation and that changes may be made within the purview of the appended claims without departing from the true scope and spirit of the invention in its broader aspects.

I claim:

1. A transducer for an aircraft control stick comprising a spring flexure means disposed in a plane normal to the axis of said control stick, a handgrip on said control stick, a mounting hub on said spring flexure, said mounting hub being constrained to nutational movement about a pivot point by said spring flexure, means to mount said handgrip rigidly on said hub, a counterbalance suspended from said hub so as to have a moment of inertia equal to that of said handgrip, and means to provide an electrical signal indicative of the amount of deflection of said spring flexure.

2. The apparatus of claim 1 in which the means to mount the handgrip on said hub includes a shaft member secured in fixed relationship to said hub, said shaft member extending beyond said hub on the side of said spring flexure member opposite said handgrip, said counterbalance being mounted on the extension of said shaft member.

3. The apparatus of claim 2 in which said transducer is enclosed in a housing and wherein said flexure member includes mounting flanges for rigidly attaching said flexure member within said housing, said means to mount said handgrip being movable with respect to said housing, and stop means secured to the walls of said housing for limiting the nutational movement of said flexure.

4. The apparatus of claim 3 wherein said means to provide an electrical signal includes cantilevered load beam means secured to said shaft member, means to deflect said load beam means in response to nutational movements of said shaft and strain gauge means responsive to the deflection of said cantilevered beam means.

5. The apparatus of claim 4 in which said cantilevered beam means includes a plurality of cantilevered beams, said apparatus further including slotted yoke means for actuating each cantilevered beam, said yoke means being secured to said mounting flanges and arranged to straddle the free ends of said cantilevered beams, said yoke means being proportioned to provide a specified clearance between the yoke and the cantilevered beam when said flexure member is in its quiescent position.

6. The apparatus of claim 5 wherein said plurality of cantilevered beams includes a first group of beams arranged to detect motion in response to pitch forces applied to said handgrip and a second group of beams arranged to detect motion in response to roll forces applied to said handgrip.

7. A control stick force transducer comprising a transducer housing, means to mount a handgrip on said transducer, means to mount said transducer on an aircraft control column, a spring flexure mounted in said housing, a central mounting hub on said flexure resiliently supported by a pair of radially disposed spring arms each having a rectangular cross-section and lying in a plane normal to the axis of said control column, a shaft secured to said mounting hub and supporting said handgrip above said flexure, said handgrip being free to move throughout a limited range in response to roll and pitch forces applied to said handgrip whereby said mounting hub is caused to deflect in a spherical fashion about a virtual pivot point, a counterbalance, said shaft extending below said mounting hub and supporting said counterbalance at a distance below said pivot point that provides a moment of inertia equal to that of said handgrip with respect to axes lying in said normal plane, stop means to limit the deflection of said spring flexure, and electrical sensing means to provide signals indicative of the amount of deflection of said spring flexure.

8. The apparatus of claim 7 wherein said sensing means includes cantilevered beams arranged to be deflected in response to motions of said shaft in excess of a predetermined threshold, said cantilevered beams having a compliance much greater than the compliance of said spring flexure, and wherein said electrical sensing means includes strain gauge means arranged to respond to deflections of said cantilevered beams.

* * * * *